UNITED STATES PATENT OFFICE.

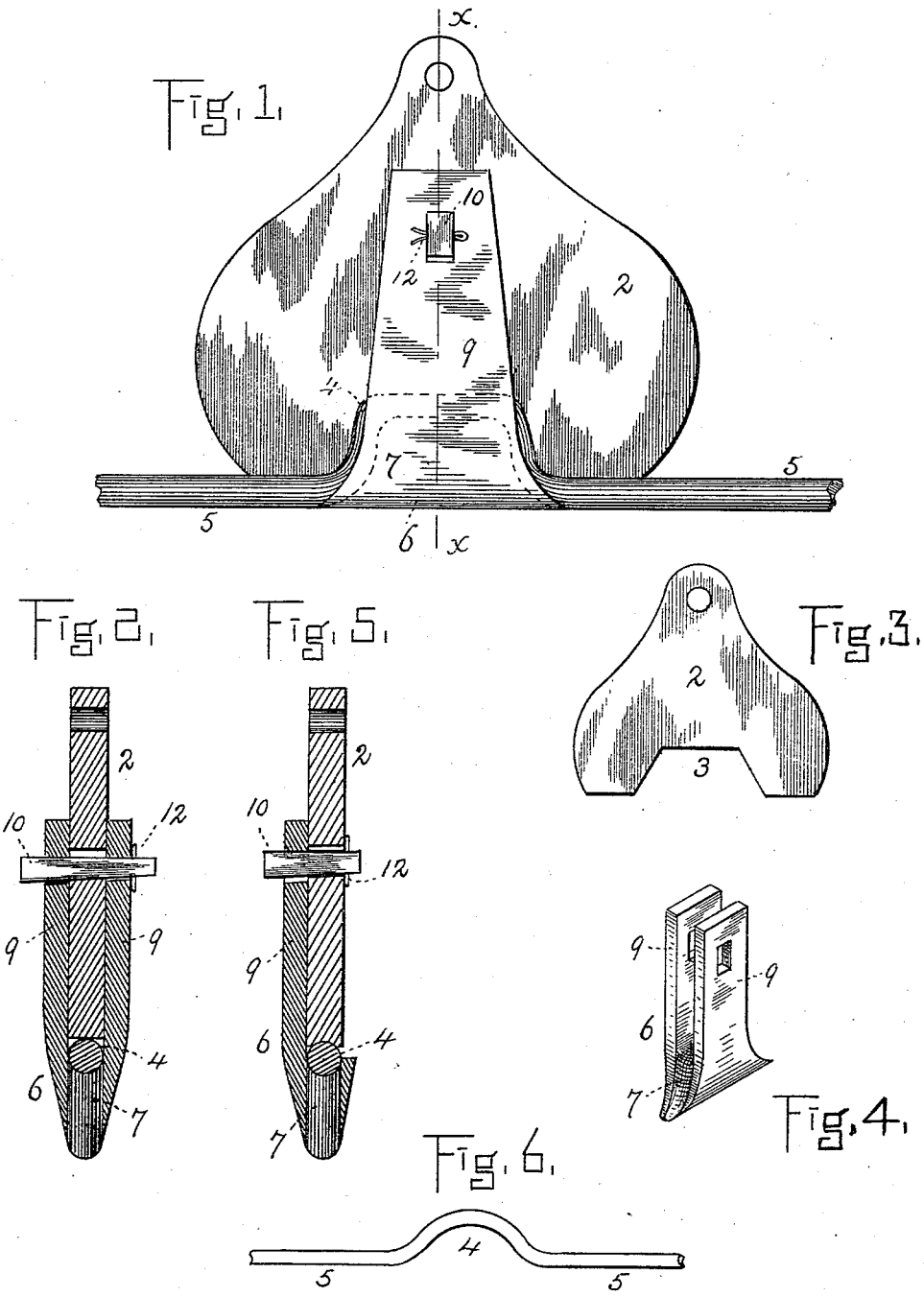

JOHN H. PALMER, OF BOSTON, MASSACHUSETTS, ASSIGNOR OF ONE-HALF TO RICHARD SMITH, OF SHERBROOKE, CANADA.

SUPPORT FOR TROLLEY-WIRES.

SPECIFICATION forming part of Letters Patent No. 458,427, dated August 25, 1891.

Application filed December 19, 1890. Serial No. 375,240. (No model.)

*To all whom it may concern:*

Be it known that I, JOHN H. PALMER, a subject of the Queen of Great Britain, residing at present in Boston, in the county of Suffolk and State of Massachusetts, have invented certain new and useful Improvements in Supports for Trolley-Wires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a support for wires, particularly "trolley-wires," so called, used in overhead electric-railway systems, and, further, to the method in which said conductors are attached to the transverse supporting-wires.

My improvements consist in a device by which the wire at its several points of suspension throughout the system is attached mechanically in contradistinction to a metallic connection or union, as by brazing or soldering now usually practiced. My device consists of a hanger-plate with a yoke, and in the formation of a bend or flexure in the trolley-wire for a short distance and at the point of support. The particular and salient features will be more fully hereinafter described, and pointed out in the claim.

The drawings herewith presented represent, in Figure 1, a side elevation of a trolley-wire support embodying my invention. Fig. 2 is a sectional elevation on line *x x*. Fig. 3 is an elevation of the hanger-plate reduced. Fig. 4 is a perspective view of the yoke likewise reduced. Fig. 5 is a modified form of the yoke. Fig. 6 is the wire with a flexure.

In said drawings, 2 represents a hanger-plate composed of a flat sheet of metal or a thin casting of any desired shape and to be attached to the cross-wires (not shown) in any suitable way. This hanger-plate is recessed or cut away in its lower portion at 3, and such recess or indenture is to correspond with a flexure or bend 4 made in the conductor or wire shown at 5. This flexure or deviation from the straight is created in the wire at a point where the latter is to be attached to a transverse wire, and said flexure is to lie in a vertical plane, and may be of any desired shape, semi-polygonal, oval, or circular, or otherwise, as circumstances may require or experience proves to be the best. In the present instance, for purposes of illustration, this flexure is of inverted-∩ shape, while the turns are easy and the strength of the conductor is not affected in the least.

By my arrangement the fastening device is mechanical, positive, not liable to get out of order, and when once secured the wire is held firmly without danger of becoming loose, except in case the wire itself should break. The wire having had the flexure or bend created is now secured to the hanger-plate by means of a yoke, which is composed of a lower member or body 7 straight upon its lowermost side to correspond and lie flush with the under surface of the straight portions of the said wire. The shape or contour of the other bounding part or prominence of said body 7 coincides with the shape of the flexure 5, and is semicircular or grooved in cross-section to allow the wire to fit therein. Vertically from said body 7 rise two arms 9 9, which straddle the hanger-plate. The latter, with the yoke, is fastened together, preferably, by means of a tapered key 10, which draws the plate 2 and yoke 6 together, thus gripping the wire firmly between them. This key is fastened by a split-pin 12 or otherwise.

In lieu of having the yoke formed with two arms only one may be employed, as shown in Fig. 5. However, in this instance, the edge of the recess 3 will be hollow to receive the wire, which is further gripped by the groove in the body of the yoke. As seen in Fig. 2, the lower part of the yoke is tapered and rounded at its extremity to conform in size with the trolley-wire in cross-section. Hence the trolley can travel along smoothly and no impediment is offered thereto. It will be noticed that the lower surface of the yoke thus forms the conductor for a short distance.

The mode of procedure is as follows: The hanger-plate is secured to the transverse wires. The trolley-wire now has the flexure created in it at the proper point. The yoke is then passed upward, causing the flexure 5 to be seated on the correspondingly-shaped contour of the prominence of the body 7. The yoke and wire are now pushed up until the upper surface of the flexure is in contact with the recess 3 in the hanger-plate. The key 10 is now driven home, which causes the trolley-wire to be firmly held between the yoke and the hanger-plate. The key is now made fast and the attachment is complete.

The facility with which a trolley-wire may be put up or taken down is very apparent.

The entire device is very light, strong, and durable, and by no possible chance can the wire become loose from said support.

What I claim is—

A wire-support consisting of a hanger-plate 2, having a recess 3, combined with a yoke 9, having a body or supporting part 7, straight on its lower side, and a key 10, passing through apertures in said yoke and plate to hold the parts together, substantially as set forth.

In testimony whereof I affix my signature in presence of two witnesses.

JOHN H. PALMER.

Witnesses:
H. E. LODGE,
FRANCIS C. STANWOOD.